United States Patent

DiPietro

Patent Number: 5,101,229
Date of Patent: Mar. 31, 1992

[54] LIGHT LOCK

[75] Inventor: Matthew DiPietro, Webster, N.Y.

[73] Assignee: Eastman Kodak Company, Rochester, N.Y.

[21] Appl. No.: 636,335

[22] Filed: Dec. 31, 1990

[51] Int. Cl.⁵ ............................................. G03B 17/26
[52] U.S. Cl. ..................................... 354/277; 378/187
[58] Field of Search ............... 354/178, 179, 275, 276, 354/277, 281, 282; 378/187

[56] References Cited

U.S. PATENT DOCUMENTS

| | | | |
|---|---|---|---|
| 728,718 | 5/1903 | Hutchings et al. | 354/179 |
| 1,120,498 | 12/1914 | Houghton | 354/179 |
| 1,172,922 | 2/1916 | Adair | 354/282 |
| 1,219,588 | 3/1917 | Ruttan et al. | 354/179 |
| 1,926,469 | 9/1933 | Weider | 354/178 |
| 2,059,900 | 11/1936 | Parker et al. | 354/178 |
| 3,958,125 | 5/1976 | Zechmair et al. | 378/187 |
| 4,008,483 | 2/1977 | Swift et al. | 354/277 |
| 4,110,624 | 8/1978 | Conteas | 378/187 |
| 4,264,821 | 4/1981 | Bauer | 378/187 |
| 4,386,431 | 5/1983 | Van Landeghem et al. | 378/187 |
| 4,408,340 | 10/1983 | Bauer | 378/187 |
| 4,589,125 | 5/1986 | Schmidt | 378/187 |
| 4,634,071 | 1/1987 | Hertel | 242/71.1 |

Primary Examiner—L. T. Hix
Assistant Examiner—Howard B. Blankenship
Attorney, Agent, or Firm—G. Herman Childress

[57] ABSTRACT

A light lock is formed by a channel with spaced walls, with the channel being open at one side. A light absorbing material is positioned in the channel and has bristles projecting toward the opening. A flange projects through the opening toward the material but is spaced from the bristles. The channel can be formed on one portion of a magazine, cassette or the like, for light tight materials such as photographic film, and the flange can be formed on another portion of such a magazine or cassette.

3 Claims, 2 Drawing Sheets

LIGHT LOCK

BACKGROUND OF THE INVENTION

This invention relates to an improved light lock and, more particularly, to a light lock that is especially suitable for effectively blocking light from entering a magazine, cassette or the like for photographic films.

Magazines, cassettes and the like for undeveloped photographic film commonly have light locks that are designed to exclude light from film in the magazine or cassette. One example of a light lock for a cartridge is found in U.S. Pat. No. 4,634,071, issued Jan. 6, 1987 in the name of H. E. Hertel and entitled "Light Tight Film Cartridge With Floating Light Seal". The seal of this patent comprises a pair of elongate sealing elements disposed adjacent opposite surfaces of a film strip. The sealing elements include a layer of black velvet-like light sealing material formed with a plurality of small, thin, flexible filaments closely spaced together and projecting outwardly into engagement with the film strip. Light locks of this kind rely on contact between the bristles of the sealing element and the film strip to exclude light from the interior of the magazine. Such contact increases wear on the bristles and encourages the bristles to break loose and adhere to the film.

U.S. Pat. No. 4,264,821, issued Apr. 28, 1981, in the name of W. Bauer, is directed to a cassette for an x-ray film. The cassette has a body part and a cover part that are hinged together so that the cassette can be opened to receive a sheet of x-ray film and closed to contain the sheet in a light tight manner. The cassette is provided with light seals around the edges comprising two parallel lips on one part of the cassette which receive a lip on the other part of the cassette when the cassette is closed.

Another x-ray film cassette is disclosed in U.S. Pat. No. 4,110,624, which issued on Aug. 29, 1978, in the name of A. P. Conteas. In this patent, a light trap has two parts formed of molded spongy, opaque plastic material comprising a female part of generally U-shaped configuration and a male part that fits within the female part and engages the bottom of the female part. The material forming the light trap also acts as a spring for a catch that holds the parts together and is effective to cause the catch to be retained in the closed position. Thus, there is a force urging the parts of the light trap away from each other.

Thus, in some of the prior art light locks, fibers of light lock elements are urged into contact with the film to effect the light lock. Others are void of fibers, and this may enable light to be reflected off the walls forming the light lock and ultimately find its way into the cassette to expose the film. Still others rely on compression of the parts forming the light lock which results in a force urging the parts of the light lock apart.

SUMMARY OF THE INVENTION

It is an object of the invention to provide an improved light lock which utilizes bristles for absorbing light but the bristles are not contacted by opposing portions of the light lock. Another object of the invention is to minimize wear on bristles in a light lock and reduce the likelihood that bristles will break loose from the light lock. A further object of the invention is to provide a light lock which does not create forces that oppose closing of the parts of a magazine on which the light lock is formed.

In accordance with the present invention, a light lock comprises a channel having first and second spaced walls and a base extending between the walls. The channel has an opening opposite the base. A light absorbing material is located on the base, and the material has bristles projecting away from the base and toward the opening. A flange projects through the opening toward the material on the base, and the flange is spaced from the bristles and from the first and second walls.

The invention, and its objects and advantages, will become more apparent in detailed description of the preferred embodiment presented below.

BRIEF DESCRIPTION OF THE DRAWINGS

In the detailed description of the preferred embodiment of the invention presented below, reference is made to the accompanying drawings, in which:

FIG. 1 is a perspective view of a magazine adapted to receive a package containing a stack of x-ray films or the like.

DETAILED DESCRIPTION OF THE PREFERRED EMBODIMENT

Figure 1:
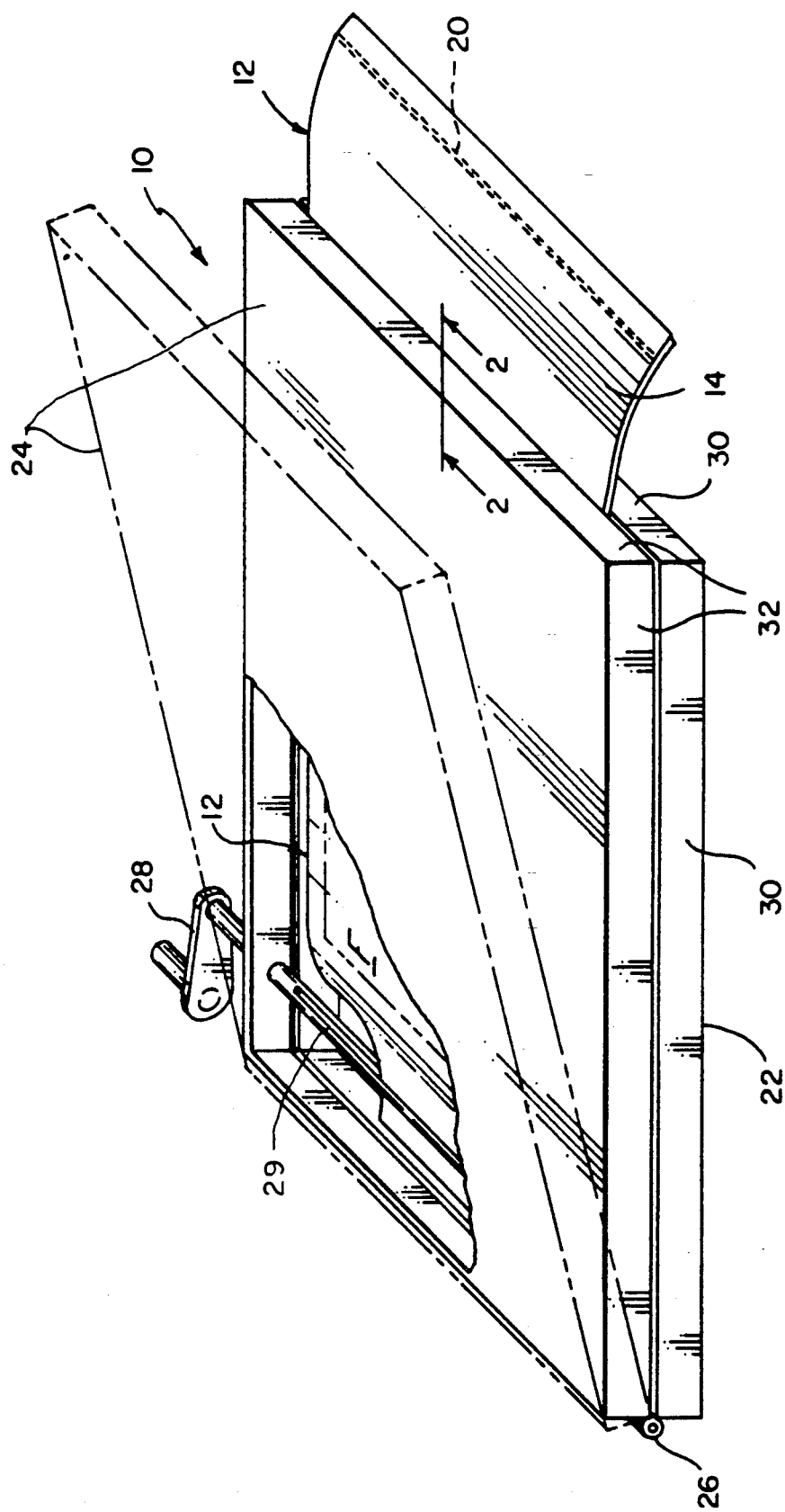

Referring initially to FIG. 1, a magazine generally designated 10 is adapted to hold one or more sheets of undeveloped film F in a light tight condition within the magazine. By way of example, a stack of film sheets can be provided to the magazine in a light tight package, a portion of which is shown at 12. Packaging material surrounds the unexposed film sheets, and an end portion 14 of the package extends outside the magazine when the package is initially loaded into the magazine. End portion 14 comprises upper and lower sheets 16,18 (FIG. 2) that are secured together by, for example, a heat seal line 20 (FIG. 1) so that the package portion outside the magazine is light tight. The side edges of the package can also be heat sealed together, or the upper and lower sheets can be formed integrally as a tube so that the side edges need not be sealed together.

The magazine 10 comprises two portions that jointly define a space within the magazine for receiving the sheets of film. More specifically, the magazine has a base 22 and a cover 24 which are illustrated as being rectangular in shape and substantially the same size. The base and cover can be secured together along one side edge by a hinge 26 in a conventional manner. This enables the cover 24 to be raised, as shown in phantom in FIG. 1, for loading a package of film sheets into the magazine and for removing the packaging material from within the magazine.

The particular magazine 10 illustrated is of the kind which is adapted to remove the packaging material from the sheets after the package is loaded in the magazine and the magazine closed. Thus, the magazine is provided with a crank or handle 28 that is connected to a spindle 29 inside the magazine. The end portion of the package opposite from the end portion 14 is attached to the spindle when the package is loaded into the magazine and while the cover is opened. Then the cover is closed and latched in the closed postion. Next, the package portion 14 is cut between the heat seal line 20 and the magazine, and the handle 28 is rotated to wind the packaging material onto the spindle and thereby remove it from the sheets of film within the magazine. This can be accomplished in a daylight environment.

Figure 2:
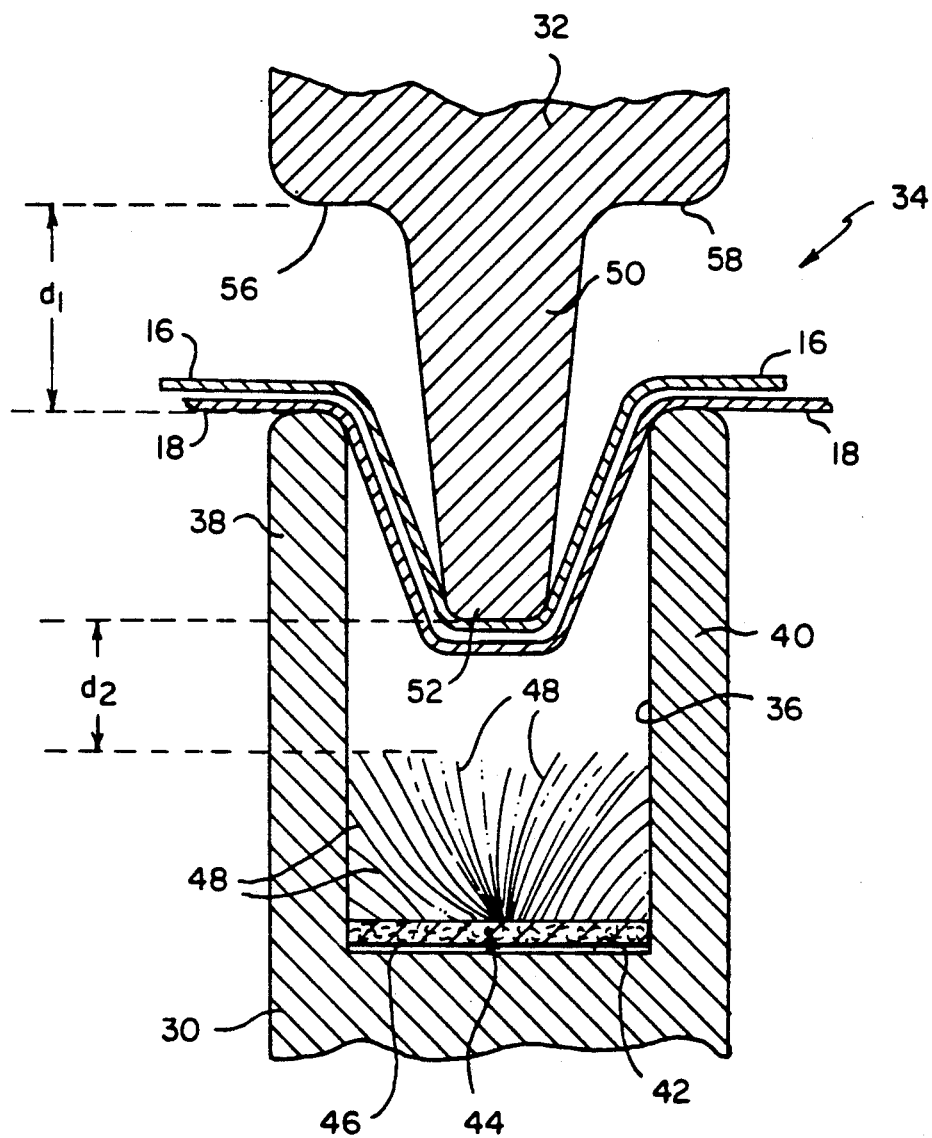
FIG. 2 is an enlarged, cross-section view taken along line 2—2 in FIG. 1, illustrating a light lock of the invention incorporated into the magazine.

Base 22 and cover 24 have side edge walls 30,32 that extend entirely around the magazine and define a portion of the space within the magazine that receives the sheets of film. As best illustrated in FIG. 2, a light lock generally designated 34 is formed between the edge walls 30,32. More specifically, the light lock 34 comprises a U-shaped channel 36 formed in edge wall 30. Channel 36 comprises two spaced parallel walls 38,40 and a base 42. The upper edges of walls 38,40 preferably are rounded, as illustrated in FIG. 2, and the channel has an opening at the top that is opposite the base 42.

A light absorbing material generally designated 44 is provided in the channel between walls 38,40. More specifically, the light absorbing material comprises a support 46 of foam plastic material, or other suitable materials, and a plurality of fibers or bristles 48. Bristles 48 are anchored in the support and project upwardly away from the support toward the opening at the top of the channel 36. However, as shown in FIG. 2, the bristles do not extend to the open end of the channel. Preferably, the bristles are relatively long, black in color, and extend across the channel from wall 38 to wall 40 so that they absorb any light that might find its way into the channel and prevent light from being reflected by the channel into the interior of the magazine.

The bristles preferably are anchored to the support in a way which minimizes the chance that bristles might break away from the support and migrate to the film in the magazine. For example, the bristles can be secured to the support by a heat sealing or sonic sealing step.

As indicated in FIG. 2, walls 30,32 are substantially the same width. Wall 32 has a flange 50 that extends from the central portion of the wall and projects downwardly from the wall into the space defined by channel 36. Flange 50 is spaced from both of the walls 38,40 of the channel and from the base 42 of the channel. The flange has a lower or tip end portion 52 that is spaced from the upper ends of the bristles 48.

Side edge wall 32 has shoulders 56,58 that extend alongside the flange 50. When the magazine is closed, these shoulders are spaced from the upper edges of walls 38,40 of the channel by a distance designated d1. Similarly, the tip end 52 of the flange is spaced from the upper ends of the fibers 48 by a distance designated d2. Distances d1, d2 may be, for example, approximately 0.125 inches. This spacing is more than enough to enable the upper and lower sheets 16,18 of the packaging material to pass over the upper edges of walls 38,40 and below the tip end 52 of the flange without contacting either the bristles 48 or the shoulders 56,58, as illustrated in FIG. 2. Thus, the packaging material does not present a resistance to the closing of the magazine even though the packaging material is deflected as shown in FIG. 2 when the magazine is closed. Such a resistance occurs in prior magazines and impedes closing movement of the magazine and movement of the packaging material through the light lock.

As will be observed from FIG. 2, anytime the cover 32 is in the closed position, light cannot travel from outside the magazine to the inside thereof, except along a tortuous path leading to the bristles 48 of the light absorbing material. More specifically, light from outside the magazine would have to pass between the shoulder 58 and the upper edge of wall 40, then downwardly between wall 40 and the flange 50, and then the light would enter the bristles 48 of the light absorbing material. The bristles are effective to absorb the light and prevent it being reflected upwardly between wall 38 and flange 50 and then between the shoulder 36 and wall 38 into the magazine. Also the light lock deflects the sheets 16,18 as shown in FIG. 2 so that light cannot pass between the sheets and reach the film. At the same time, the elements of the light lock are spaced apart so that the light lock minimizes the force required to close the cover 32. The light lock can be provided along only one side edge of the magazine, if desired, but it is preferred that the light lock be provided along all four side edges of the magazine.

The light lock is simple in construction, easy to manufacture and effective to block light from entering the magazine. Also, it does not provide a resistance to closing of the cover, nor does it provide a force tending to open the cover. There is no contact between the bristles 48 and the flange 50, which is normally required with prior art light locks, nor is there contact between the bristles and the sheets 16,18 of the package as the package is pulled through the light lock. Because the bristles are not contacted, they do not wear out, and the bristles are not likely to break off and find their way into the magazine. Also, the absence of contact between the bristles and the sheets 16,18 results in less resistance to pulling the sheets through the light lock.

Some dirt and other foreign material may enter the bristles over a period of time without adversely effecting the light lock. Weep holes (not shown) can be provided from the absorbent material 44 to the exterior of the magazine to provide a path for any liquid that might accidentally enter the light lock. If desired, light absorbing material 44 also can be provided at other locations, such as on the inside surface of walls 38,40, or on the flange 50 or shoulders 56,58.

The invention has been described in detail with particular reference to a preferred embodiment thereof, but it will be understood that variations and modifications can be effected within the spirit and scope of the invention.

I claim:

1. A light lock comprising a channel having first and second spaced walls and a base extending between the walls, the channel having an opening opposite the base, and a light absorbing material located on the base, the material having bristles projecting away from the base and toward the opening, and a flange projecting through the opening toward the material on the base, the flange being spaced from the bristles and from the first and second walls.

2. A light lock as set forth in claim 1 wherein the bristles extend substantially across the channel between the spaced walls.

3. In a magazine or the like for holding one or more sheets of undeveloped film in a light tight condition, the magazine having a base portion and a cover portion for enclosing the film within the magazine, and a light lock around the film in the magazine, the improvement wherein the light lock comprises a U-shaped channel on one of the portions of the magazine and a flange on the other of the portions of the magazine, the channel having first and second spaced walls and having an opening facing the flange, the walls being spaced apart at the opening by a distance greater than the width of the flange so that the flange can be received within the opening between the walls without touching the walls, and a plurality of elongate, light absorbing bristles in the channel between the walls and spaced from the flange.

* * * * *